United States Patent
Tanimoto et al.

[11] Patent Number: 5,844,561
[45] Date of Patent: Dec. 1, 1998

[54] INFORMATION SEARCH APPARATUS AND INFORMATION SEARCH CONTROL METHOD

[75] Inventors: Akira Tanimoto, Kashihara; Toshiyuki Masui, Meguro-ku, both of Japan

[73] Assignee: Sharp Kabushiki Kaisha, Osaka, Japan

[21] Appl. No.: 740,007

[22] Filed: Oct. 23, 1996

[30] Foreign Application Priority Data

Oct. 23, 1995 [JP] Japan ................................. 7-274516

[51] Int. Cl.⁶ ........................................................ G06F 3/00
[52] U.S. Cl. .................................................. 345/357; 707/3
[58] Field of Search .............................. 345/968, 973, 345/340, 341, 123, 339, 348, 356, 357; 707/3, 4, 5, 6, 904, 907; 40/371

[56] References Cited

U.S. PATENT DOCUMENTS

| | | | |
|---|---|---|---|
| 5,263,134 | 11/1993 | Paal et al. .................................. | 345/342 |
| 5,317,306 | 5/1994 | Abraham et al. ........................ | 345/118 |
| 5,402,152 | 3/1995 | Needham ................................. | 345/179 |
| 5,418,549 | 5/1995 | Anderson et al. ....................... | 345/145 |
| 5,485,174 | 1/1996 | Henshaw et al. ........................ | 345/123 |
| 5,510,808 | 4/1996 | Cina, Jr. et al. ......................... | 345/123 |
| 5,627,980 | 5/1997 | Schilit et al. ............................. | 345/353 |
| 5,634,064 | 5/1997 | Warnock et al. ........................ | 707/513 |
| 5,680,561 | 10/1997 | Amro et al. .............................. | 345/341 |

FOREIGN PATENT DOCUMENTS

| | | |
|---|---|---|
| 7-13679 | 1/1995 | Japan . |
| 7-121562 | 5/1995 | Japan . |
| 8-287089 | 11/1996 | Japan . |

OTHER PUBLICATIONS

"The Vector Effect," 3D, N.15, p. 28(2) 1989.

*Primary Examiner*—A. Katbab
*Attorney, Agent, or Firm*—Nixon & Vanderhye P.C.

[57] ABSTRACT

The information search apparatus of the invention includes: a memory for storing character information therein, a display tablet having a function of displaying at least one character information and a function of inputting data, a detecting section for detecting a position at which an input pen has come into contact with the display tablet, and a control section for performing a control such that a function cursor, used for searching for arbitrary character information through the character information, is displayed at the detected position. In the information search apparatus, the control section extracts a plurality of character information from the character information for searching for the arbitrary character information through the character information.

12 Claims, 12 Drawing Sheets

INFORMATION SEARCH APPARATUS AND INFORMATION SEARCH CONTROL METHOD

BACKGROUND OF THE INVENTION

1. Field of the Invention

The present invention relates to an information search apparatus used as a database search system for small-sized portable electronic equipment like a word processor or an electronic pocketbook and personal computers. More specifically, the present invention relates to an information search apparatus for specifying a desired key word by using a pen-type input device on a display tablet and thereby searching for various information associated with the specified key word.

2. Description of the Related Art

In a conventional database search system, a character string representing a key word, such as a word, is input through a keyboard and the input character string representing the key word is displayed in a display section. Thereafter, when a search execution is instructed by manipulating a search key, various information associated with the input key word can be searched for. Such a key word input method is applicable, for example, to obtaining a translated word (e.g., a Japanese word) from an English word.

However, since such a key word input method requires a user to input a key word every time the user wants to perform a search operation, the input operation becomes troublesome for the user. In addition, if a user cannot recall a desired key word correctly, the user cannot easily search for information associated with the key word.

As a method for solving such a problem, an operation control method is disclosed, for example, in Japanese Patent Application No. 7-90548 entitled "dictionary search method and dictionary search apparatus". In accordance with the method disclosed in this patent application, a desired key word is not input but selected from dictionary data displayed as a list on a display screen while using a mouse as a pointing device, thereby searching for information associated with the key word.

In accordance with this method, first, a part of the dictionary data is roughly displayed on the display screen in the first step. If the cursor located in a region assigned to a word having a spelling most similar to that of the desired key word is moved to the left (or to the right) while clicking the mouse, then the space between the specified word and the next word on the table is magnified, so that some of the words which exist between these two roughly displayed words but have been hidden come to be displayed on the screen. Thereafter, if this operation is repeatedly performed by further moving the cursor to the left (or to the right) while clicking the mouse, then the space between the specified word and the next word on the table is successively magnified until all the words existing between the two words originally displayed on the screen finally appear. On the other hand, if the cursor is moved to the right (or to the left) of a word while clicking the mouse, then the space between the specified word end the next word on the table is scaled down, so that the contents of the dictionary data are displayed more roughly.

While the space between two words originally displayed on the screen is successively magnified in this way, finer character strings in the vicinity of the word specified by clicking the mouse are sequentially displayed on the screen hierarchically. Each of these character strings corresponding to the words existing between the two words appears on the display screen when the character string has been magnified to have a predetermined size.

In the second step, if the cursor is moved upward or downward while clicking the mouse, then the specified location is changed. By moving the cursor in this way, a word or a key word having a spelling most similar to that of the desired key word is searched for. If the desired key word has not been found, then the processing flow returns to the first step. On the other hand, if the desired key word has been found, then the region assigned to a particular character string representing the desired key word is magnified while double-clicking the mouse in the third step, thereby searching for the associated information corresponding to the character string among the dictionary data and displaying the contents thereof on the display screen.

In accordance with this operation control method, the desired key word can be visually searched by means of consecutive zoom-in (magnification) and zoom-out (scaling-down) operations. Thus, it is no longer necessary for a user to perform a troublesome key word input operation. In addition, even if the user cannot recall the desired key word correctly, the user can advantageously gain access to the desired key word quickly and rapidly obtain the information associated with the key word.

In this operation control method, a mouse is used as an input device in the case of a personal computer, for example. However, since various kinds of small-sized portable electronic devices such as an electronic pocketbook, a portable information terminal device and a word processor are intended to be carried, it is difficult for a user to secure a flat and wide space suitable for appropriately operating the mouse. Furthermore, even when slight shock is applied to a mouse, the coordinates specified by the mouse on the screen are largely varied. Thus, it becomes difficult for a user to appropriately specify the coordinates by the use of a mouse particularly when such a portable device is used by a user traveling in transport facilities.

On the other hand, a display tablet utilizing a lightweight display medium such as liquid crystal has recently been adopted as an input device in view of the broad utilizability thereof. Furthermore, a pen-type input device such as an electronic pen has recently been frequently used as a pointing device for performing an input operation. If such a display tablet is employed for a small-sized portable electronic device such as an electronic pocketbook, a portable information terminal device or a word processor, then it is expected that the above-described problems can be solved. That is to say, it is no longer necessary to secure a flat space required for operating a mouse. In addition, the coordinates can be correctly specified and controlled even when a user is travelling in transport facilities. As described above, in the case of using a mouse, various kinds of specification controls such as a magnification and a scaling-down of a space between two words are realized by performing a two-dimensional movement operation and a clicking specification operation in combination. However, in the case of performing a specification operation by the use of a pen-type input device on a display tablet, only respective specification control points (i.e., guidance) located on a periphery of a display screen can be controllably specified through a pen-type input device. Thus, in such a case, a user must turn away from a character string, on which the user currently concentrates his attention, to the guidance located at different positions on the screen, i.e., on the periphery of the display screen. As a result, since the attention of the user is disturbed by this position specification operation, the user is likely to commit an error or the decision of the user is likely to be delayed. Moreover, it is troublesome for a user to search for the desired guidance on the periphery of the screen. Therefore, such a specification operation has problems in that user's attention is likely to be disturbed and that it is difficult for a user to smoothly perform the specification operation.

SUMMARY OF THE INVENTION

According to the present invention, an information search apparatus is provided. The information search apparatus includes: a memory for storing character information therein; a display tablet having a function of displaying at least one character information and a function of inputting data; a detecting section for detecting a position at which an input pen has come into contact with the display tablet; and a control section for performing a control such that a function cursor, used for searching for arbitrary character information through the character information, is displayed at the detected position. In the information search apparatus, the control section extracts a plurality of character information from the character information for searching for the arbitrary character information through the character information.

According to another aspect of the present invention, an information search apparatus is provided. The information search apparatus includes: a memory for storing character Information therein; a display tablet having a function of displaying arbitrary character information and a function of inputting data; a detecting section for detecting a position at which an input pen has come into contact with the display tablet and a direction in which the Input pen moves on the display tablet; and a control section for extracting a plurality of character information from the character information based on the detected direction for searching for the arbitrary character information through the character information.

In one embodiment, the character information is selected from a group consisting of a Japanese dictionary, a classical Chinese-Japanese dictionary, an English-Japanese dictionary and a Japanese-English dictionary.

In another embodiment, the function cursor has a zoom-in operation indicia and a zoom-out operation indicia, and the control section sets an interval used for extracting the plurality of character information to be a first interval when the zoom-in operation indicia has been pushed by the input pen and sets the interval used for extracting the plurality of character information to be a second interval when the zoom-out operation indicia has been pushed by the input pen, and the second interval is wider than the first interval.

In still another embodiment, the function cursor has a scroll operation indicia for controllably specifying one of an upward and a downward display screen movement and a movement operation indicia for specifying and moving a display position of the function cursor by using the input pen.

According to still another aspect of the present invention, an information search control method is provided. The method includes the steps of: storing character information; detecting a position at which an input pen has come into contact with a display tablet, the display tablet having a function of displaying at least one character information and a function of inputting data; displaying a function cursor, used for searching for arbitrary character information through the character information, at the detected position; and extracting a plurality of character information from the character information via the function cursor for searching for the arbitrary character information through the character information.

According to still another aspect of the present invention, an information search control method is provided. The method includes the steps of: storing character information; detecting a position at which an input pen has come into contact with a display tablet and a direction in which the input pen moves on the display tablet, the display tablet having a function of displaying arbitrary character information and a function of inputting data; and extracting a plurality of character information from the character information based on the detected direction for searching for the arbitrary character information through the character information.

Hereinafter, the functions or the effects to be attained by the present invention will be described.

According to the present invention, various problems caused when a mouse is used, particularly when a mouse is used for a small-sized portable electronic device can be solved by adopting a pen input type display tablet as an input device for a database search system. More specifically, unlike the case of using a mouse, a user is no longer required to secure a flat space in using a small-sized portable device. In addition, even when a user is travelling in transport facilities, the user can correctly perform various kinds of specification controls. In addition, by displaying a function cursor F within a region on which the user's attention is concentrated and utilizing the detection switch functions of the function cursor F, various kinds of operations can be performed by the user by the use of an input pen. Therefore, the present invention can improve the poor performance of a conventional pen input type apparatus. Furthermore, since a user is no longer required to turn away from the position on which the user's attention is now concentrated, the user's attention is not disturbed or the user's operation is not interrupted, so that desired information can be searched for more smoothly. That is to say, consecutive processing is realized in performing a zoom-in or a zoom-out control, for example. Since the function cursor functioning as operation guidance is located in the vicinity of the contact point of the input pen, the user is no longer required to largely turn his eyes or to search for desired guidance located on the periphery of the screen, unlike a conventional apparatus. Moreover, in performing a zoom-in or a zoom-out control, an image can be moved in a Z direction (i.e., a depth direction of the display screen) without largely changing the operation coordinates in the X and Y directions (i.e., lateral and longitudinal directions of the display screen). If the operation coordinates are moved in the X and the Y directions, then the user cannot help feeling some annoyance. However, the present invention can reduce such en annoyance.

In addition, a key region having a function of outputting a notification sound is provided as a center region of the function cursor F. When the input pen passes through this region, a peep sound or the like is output. Thus, while a user is trying to find a searched for character string by repeatedly performing the zoom-in and the zoom-out controls, the notification sound tells the user that the zoom-in and the zoom-out controls have been interchanged. As a result, the user can perform these controls more easily.

Thus, the invention described herein makes possible the advantage of providing an information search apparatus and an information search control method which enable a user to smoothly search for desired information by the use of a display tablet without disturbing the user's attention or interrupting the user's operation by requiring the user to turn away from the location onto which the user's attention is currently concentrated.

This and other advantages of the present invention will become apparent to those skilled in the art upon reading and understanding the following detailed description with reference to the accompanying figures.

BRIEF DESCRIPTION OF THE DRAWINGS

FIG. 2A is a perspective view illustrating the display screen of the display section 1 shown in FIG. 1, while

FIG. 12A is a diagram showing a database search display region on the display screen of the exemplary information search apparatus in a second example of the present inventions while

DESCRIPTION OF THE PREFERRED EMBODIMENTS

Hereinafter, the embodiments of the present invention will be described with reference to the accompanying drawings.

EXAMPLE 1

Figure 1:
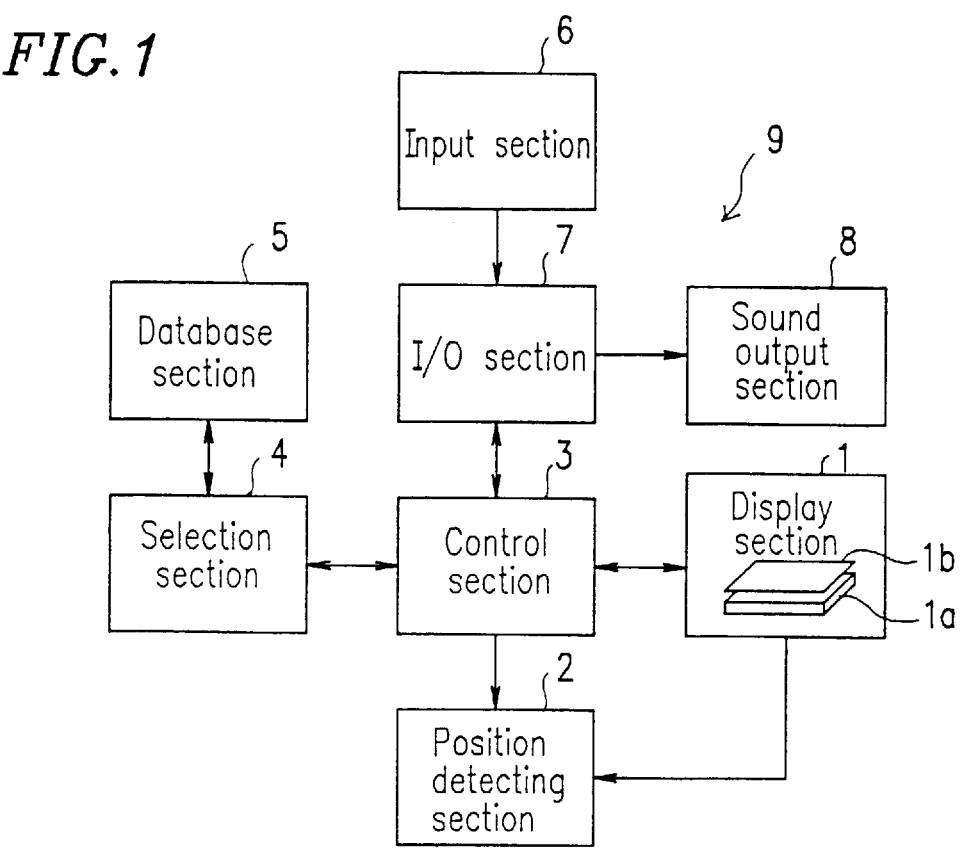
FIG. 1 is a block diagram showing the functional configuration of an information search apparatus in a first example of the present invention.

FIG. 1 is a block diagram showing the functional configuration of an information search apparatus in a first example of the present invention.

As shown in FIG. 1, a display section 1 includes: a display unit 1a (e.g., that of a liquid crystal display device), and a display tablet 1b into which the display function of the display screen included in the display unit 1a and the input specification function are incorporated. A position detecting section 2, to which the display section 1 is connected, detects which position on the display tablet 1b has been contacted by a pen-type input device (hereinafter, simply referred to as an "input pen") (not shown) such as an electronic pen. A control section 3, to which the position detecting section 2 is connected, is also connected to the display section 1. The control section 3 functions as a function cursor display controller. More specifically, the control section 3 provides display control signals for a function cursor F (to be described in detail later) which is a display window (or a display symbol) having various operation key functions. For example, this function cursor F enables a user to extract some character strings from a group of character strings stored as dictionary data and simultaneously display the plurality of character strings as a list on the display screen including the position detected by the position detecting section 2. When this extraction is performed, the interval between the two words to be extracted can be made narrower by decreasing an omission ratio which can be specified by this function cursor F. Herein, the "omission ratio" may mean either the width of a space between two adjacent items which are displayed on the display screen or a gap between two adjacent items which should be displayed on the display screen. The omission ratio is determined by the user.

In addition, the control section 3 is also connected to a database section 5 via a selection section 4. Depending upon which of a plurality of regions corresponding to the respective operation key regions of the function cursor F displayed on the display screen has been detected by the position detecting section 2, a plurality of character strings are extracted from the group of character strings stored as dictionary data in the database section 5 at a predetermined extraction interval via the selection section 4 and simultaneously displayed as a list on the display screen of the display section 1. If the desired character string (i.e., the object to be searched for) cannot be not found in the list, then the control section 3 controls the selection section 4 to successively reduce the extraction interval until a plurality of character strings including the desired character string are simultaneously displayed on the screen as a list. Furthermore, in the case where the position detected by the position detecting section 2 exists in a conversion region, the control section 3 controls the selection section 4 to search for the information associated with the searched-for character string among the group of character strings stored as dictionary date in the database section 5 and to display the character strings on the display screen of the display section 1.

In the database section 5, not only are a large number of character strings electronically stored in a predetermined order but also information associated with the character strings are so stored. The dictionary data stored in the database section 5 includes general-purpose information such as a Japanese dictionary, a dictionary of classical Chinese explained in Japanese (hereinafter, simply referred to as a "classical Chinese-Japanese dictionary"), an English-Japanese dictionary and a Japanese-English dictionary and other particular associated information such as memorandum information which has been input by the user in association with a particular character string.

An input section 6, such as a keyboard, is connected to the control section 3 via an I/O section 7. The control section 3 is further connected to a sound output section 8, such as e buzzer, via the I/O section 7. The information search apparatus 9, such as a portable information terminal device formed of these sections, enables a user to smoothly specify a desired key word by the use of an input pen on the display tablet 1b.

Figure 2A:
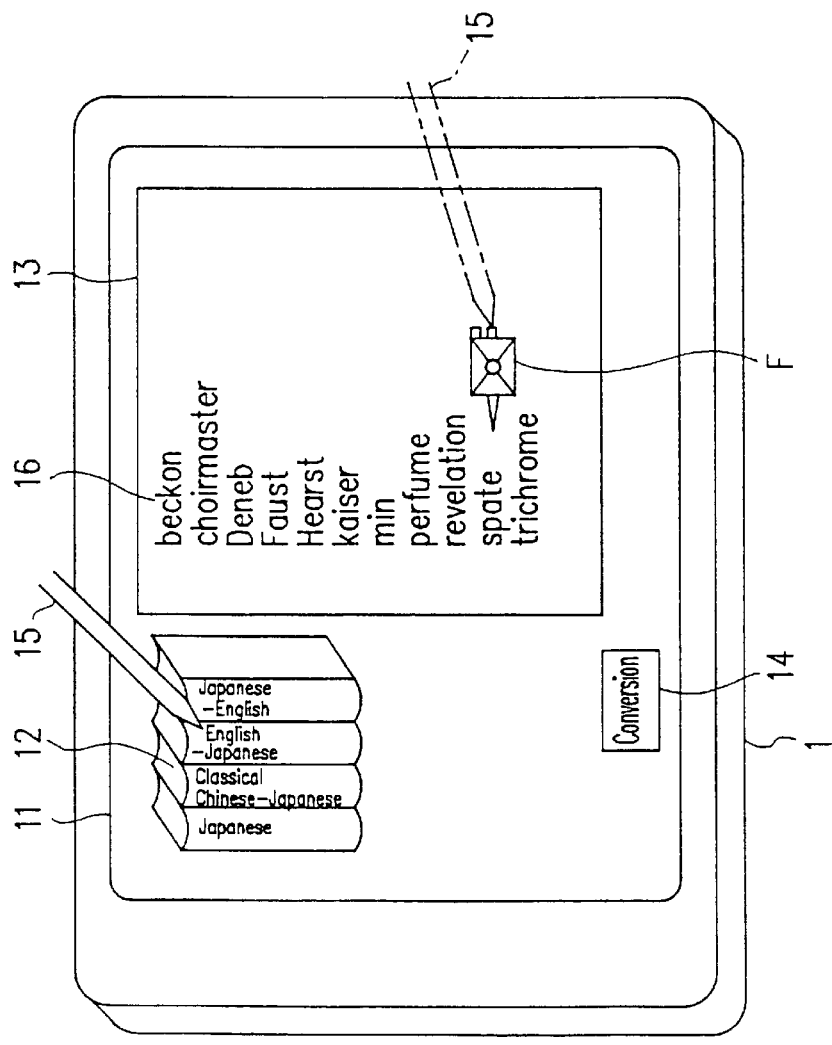
Figure 2B:
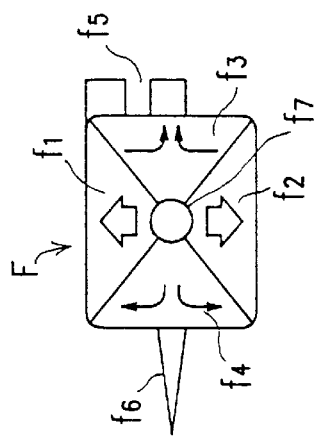
FIG. 2B is an enlarged view of the function cursor F shown in FIG. 2A.

FIG. 2A illustrates the display screen of the display section 1 shown in FIG. 1, while FIG. 2B is an enlarged diagram of the function cursor F shown in FIG. 2A.

As shown in FIG. 2A, a dictionary mode selection region 12, a database search display region 13 and a conversion key region 14 are provided on a display screen 11. A plurality of icons representing the respective dictionaries are displayed in the dictionary mode selection region 12. By contacting the input pen 15 with an arbitrary icon corresponding to the desired dictionary, arbitrary dictionary data can be selected from the various kinds of dictionary data stored in the Japanese dictionary, the classical Chinese-Japanese dictionary, the English-Japanese dictionary, the Japanese-English dictionary and the like, so that a plurality of search character strings 16 corresponding to the arbitrary dictionary data are displayed in the database search display region 13. In the case of searching for a desired key word from the displayed search character strings 16, if the region assigned to a word having a spelling most similar to that of the key word is contacted with the input pen 15, then the function cursor F having various kinds of detection switch regions for magnifying or scaling down a space between two words and for scrolling up or down the screen can be additionally displayed at the position specified by the input pen 15 on the display tablet 1b.

In FIG. 2B, regions f1 to f7 of the function cursor F are not only display regions but also detection switch regions used for the pen input operation. A region f1 is provided on the upper quarter of the function cursor F and has a function of upwardly moving the display position on the screen. On the other hand, a region f2 is provided on the lower quarter of the function cursor F and has a function of downwardly moving the display position on the screen. The function of upwardly or downwardly moving the display position on the screen is equivalent to the function of relatively moving the function cursor F upward or downward, because the entire display screen is scrolled up or down if the input pen 15 is contacted with the function cursor F. Furthermore, a region f3 is provided on the right quarter of the function cursor F and has a function of magnifying the space between two words, while a region f4 is provided on the left quarter of the function cursor F and has a function of scaling down the space between two words. By magnifying or scaling down the space between two words, a desired group of character strings, such as a group of words regularly arranged in the order of English alphabets or in the order of Japanese kana syllabary, can be displayed in accordance with the magnification power, so that a desired key word can be selected and specified by performing a series of smooth operations. Furthermore, a region f5 is provided adjacent to the right end of the function cursor F. This region f5 is a display movement specification region. If the input pen 15 is moved to any direction while keeping the input pen 15 in contact with the region f5, the region in which the function cursor F is displayed is controlled to be moved along with the input pen 15. Furthermore, a region f5 is provided adjacent to the left end of the function cursor F. This region f6 is an arrow display region. That is to say, a character string designated by the direction of the arrow becomes an object to be controlled (e.g., a character string to be finally searched for). Furthermore, a region f7 is provided as a center region of the function cursor F. If the input pen 15 passes this region f7, then a peep sound is output, thereby notifying the user that a zoom-in operation is switched into a zoom-out operation or vice versa while the user is trying to find the key word by repeatedly performing the zoom-in and zoom-out operations. As a result, the user can perform these operations more easily.

The graphics of this function cursor F are displayed by memorizing the relative coordinates thereof. If the coordinates corresponding to the lines defining the regions f1 to f7 functioning as key switch areas of the function cursor F are memorized in addition to the relative coordinates, then the regions f1 to f7 can be easily identified from each other.

On the other hand, in the case where the input pen 15 is initially contacted with some arbitrary point on the screen, the coordinates of the contact point are detected and the absolute coordinates thereof are made equal to the coordinates at the top end of the region f5 of the function cursor F, thereby displaying the function cursor F at the contact point on the screen. In the case where the graphics of the function cursor F thus displayed are contacted with the input pen 15, it is possible to easily determine which of the seven regions f1 to f7 has been contacted with the input pen 15 based on the absolute coordinates of the contact point and the relative coordinates of the function cursor F. Also, in the case where the user desires to move the entire graphics of the function cursor F, first, it is determined whether or not an operation for moving the entire graphics should be performed by contacting the input pen 15 with the region f5. Then, the user drags the input pen 15 from the contact point to an arbitrary point to which the user wants to move the function cursor F (hereinafter, simply referred to as a "destination point of the function cursor F"). The control section 3 adjusts the movement distance and the movement direction of the input pen 15 to be equal to those of the graphics of the function cursor F, so that the graphics of the function cursor F can be controlled to move to the destination point on the screen. Furthermore, if the position detection section 2 detects that the input pen 15 has come into contact with the region f3, for example, the zoom-in control of the image is repeatedly performed all through the period during which the input pen 15 is in contact with the display tablet 1b. In such a case, a consecutive zoom-in operation can be performed smoothly.

Figure 3:
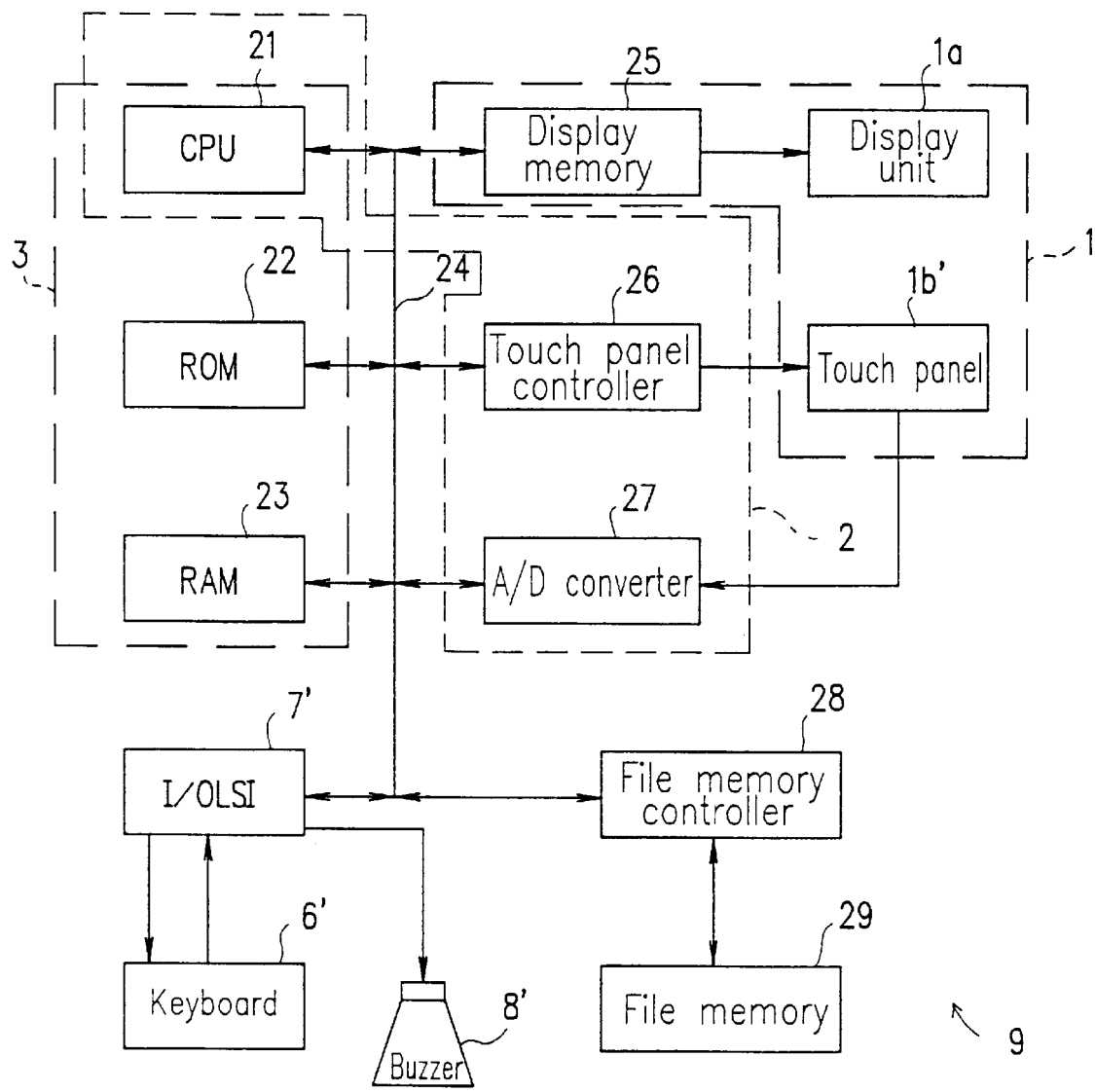
FIG. 3 is a block diagram showing the hardware configuration of the information search apparatus 9 shown in FIG. 1.

FIG. 3 is a block diagram showing the hardware configuration of the information search apparatus 9 shown in FIG. 1.

In FIG. 3, a central processing unit (CPU) 21 controls the operation of the information search apparatus 9. A read-only memory (ROM) 22 for storing the programs executed by the CPU 21 for controlling the operation of the information search apparatus 9, and a random access memory (RAM) 23 which is a readable rewritable memory used as a work area for the programs executed by the CPU 21 or a storage medium for the data input by the user are connected to the CPU 21 via a bus 24. The control section 3 is formed of the CPU 21, the ROM 22 and the RAM 23.

An I/O control large-scale Integrated circuit (LSI) 7' functioning as the I/O section 7 is also connected to the CPU 21 via the bus 24. A keyboard 6', having fixed input keys and functioning as the input section 6, and a buzzer 8', generating a notification sound and functioning as the sound output section 8, are connected to the I/O control LSI 7'. The operation instructions input through the keyboard 6' are input to the CPU 21 vie the I/O control LSI 7' and a notification sound signal having an audible frequency is supplied to the buzzer 8' via the I/O control LSI 7' in response to the instruction signal supplied from the CPU 21.

A display memory 25, a touch panel controller 26 and an A/D converter 27 are further connected to the bus 24 to which the CPU 21 is connected. A display unit 1a, such as a liquid crystal display device, is connected to the display memory 25 and performs display functions in accordance with the contents of the data written onto the display memory 25. An analog touch panel 1b', functioning as the display tablet 1b to which the touch panel controller 26 is connected, is also connected to the A/D converter 27. The display section 1 is formed of the display unit 1a, the analog touch panel 1b' and the display memory 25. Also, the position detecting section 2 is formed of the CPU 21, the touch panel controller 26 and the A/D converter 27 and detects which position of the display tablet 1b has been contacted with the input pen 15.

The analog touch panel 1b', functioning as the display tablet 1b, is made of a transparent tablet which has been formed so as to be deposited on the display region of the display unit 1a. In this tablet 1b, a pair of resistive films made of indium tin oxide (ITO) or the like are formed on the respective surfaces of a pair of transparent substrates having flexibility such that these resistive films face each other and are disposed via a predetermined gap therebetween. A voltage is applied to one of the pair of resistive films. This applied voltage is continuously varied from the input terminal side to the output terminal side. On the other hand, the other resistive film is not grounded and the voltage from the one film is detected in this film when the input pen 15 comes into contact with the screen and causes the resistive films to come into contact with each other.

A file memory controller 28 is further connected to the bus 24 to which the CPU 21 is connected. The file memory controller 28 is connected to a file memory 29 such as an IC memory card or a hard disk drive and controls the reading and the writing operations from/onto the file memory 29. The database section 5 is formed of the file memory 29 or the ROM 22. The selection section 4 is formed of the CPU 21 and the file memory controller 28.

Next, a method for inputting rectangular coordinates (X, Y) on the display screen by the use of the display tablet 1b (the analog touch panel 1b', in particular) and the input pen 15 will be described. when the user contacts the input pen 15 with the analog touch panel 1b' at a point, the upper and the lower resistive films of the analog touch panel 1b' come into contact with each other at the contact point.

For example, when the direction from the input section to the contact point of the upper resistive film is assumed to be an X direction, the resistance value from the input section to the contact point of the upper resistive film corresponds to the X coordinate. On the other hand, when the direction from the contact point to the output section of the lower resistive film is assumed to be a Y direction, the resistance value from the contact point to the output section of the lower resistive film corresponds to the Y coordinate. By making a current flow between the input section of the upper resistive film and the output section of the lower resistive film and measuring a voltage between the input section and the output section, the coordinates (X, Y) specified by the use of the input pen 15 can be obtained.

It is noted that the direction from the input section to the contact point of the upper resistive film may be assumed to be the Y direction. In such a case, the direction from the contact point to the output section of the lower resistive film is assumed to be the x direction.

By alternately and repeatedly performing such an operation so as to be switched via a predetermined time interval, the coordinates of the pen input point can be detected at any time at a resolution of 10-odd points/millimeter. The CPU 21 executes suitable processing corresponding to the displayed function key F with reference to the coordinate conversion table (to be described later) based on the detected coordinates. That is to say, the CPU 21 executes control processing corresponding to the display region of the function cursor F including the detected coordinates and a region for an icon, a key or a button. Such a tablet device can be implemented, for example, with reference to Japanese Laid-Open Patent Publication No. 7-13679 filed by the present applicant. Alternatively, an electrostatic induction type tablet device disclosed in Japanese Patent Publication No. 7-69763 or an electromagnetic induction type tablet device may also be used.

The coordinates (X, Y) of the contact point at which the user has contacted the input pen. 15 with the touch panel 1b' are output as analog values to the A/D converter 27. On the other hand, the touch panel controller 26 controls the voltages in the X-axis and the Y-axis directions of the touch panel 1b'. The A/D converter 27 converts the analog values which represent the coordinates (X, Y) and have been output from the touch panel 1b' into digital values which can be processed by the CPU 21.

Next, the relationship between the coordinate data obtained by performing the pen input operation and the display information will be described.

The system program used for the present apparatus, the coordinate conversion tables (to be described later) for linking the X-Y coordinate information output from the touch panel controller 26 and the image information displayed in the display unit 1a together, and font information end the like are stored in the ROM 22. In addition, various kinds of image information corresponding to the respective functions including a schedule search function, a dictionary selection function and a character information input function, which are activated when the user selects a corresponding function icon by the use of an input pen or the like, and coordinate conversion tables for defining the coordinates of the image information are also stored in the ROM 22. The image information and the coordinate conversion tables stored in the ROM 22 correspond to the functions which are used relatively frequently. On the other hand, the image information and the coordinate conversion tables corresponding to the other functions are stored in the file memory 29.

Next, a coordinate conversion table used for linking image information and coordinate information together will be described.

Figure 4:
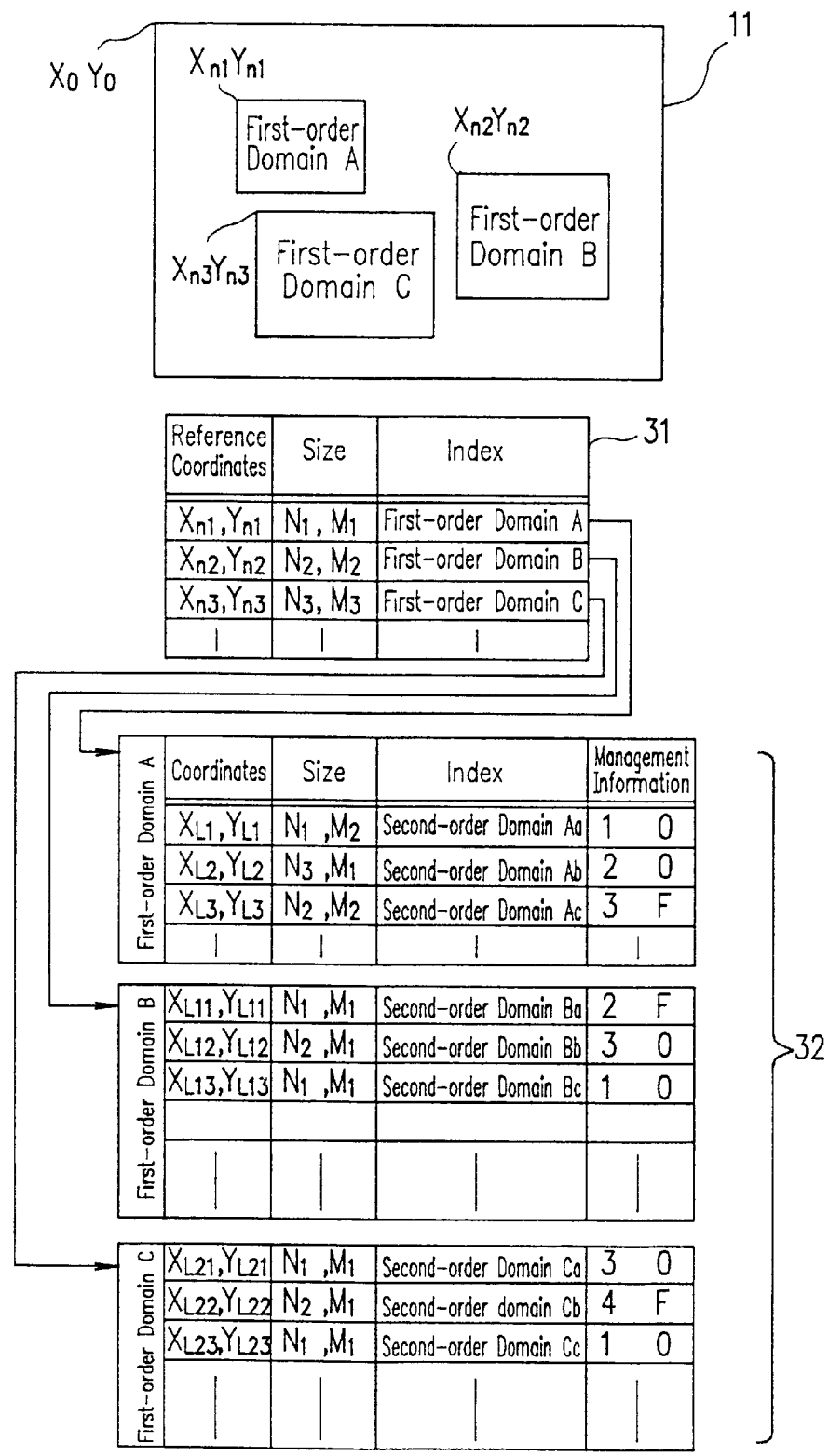
FIG. 4 is a diagram illustrating a position management table and coordinate conversion tables of the information search apparatus 9 in the first example.

FIG. 4 is a diagram illustrating a position management table and coordinate conversion tables in the information search apparatus of the first example.

As shown in FIG. 4, a position management table 31 for managing the positions of the respective first-order domain data displayed on the display screen 11 shown in FIG. 2A and a plurality of coordinate conversion tables 32 linked to the respective index data of the position management table 31 are stored in the RAM 23 shown in FIG. 3. Every time domain data is read out from the ROM 22 or the file memory 29 shown in FIG. 3, these tables are updated.

Coordinate information to be obtained from the touch panel 1b' shown in FIG. 3 is composed of coordinate data in the lateral and the longitudinal directions obtained by assuming the upper left corner of the display screen to be a reference point $(X_o, Y_o)$, for example. In the position management table 31, coordinate data $(X_{n1}, Y_{n1})$, $(X_{n2}, Y_{n2})$, $(X_{n3}, Y_{n3})$ and so on about the reference points of the respectively displayed first-order domain date; size data $(N_1, M_1)$, $(N_2, M_2)$, $(N_3, M_3)$ and so on of the first-order domain data areas corresponding to the respective coordinate data $(X_{n1}, Y_{n1})$, $(X_{n2}, Y_{n2})$, $(X_{n3}, Y_{n3})$ and so on; and index data (First-order Domain A, First-Order Domain B, First-Order Domain C and so on) are stored, In the first example, the dictionary mode selection region 12, the database search display region 13 and the conversion key region 14 shown in FIG. 2A correspond to First-Order Domains A, B and C, respectively. On the other hand, the index date (Second-Order Domain Ba, Second-Order Domain Bb, Second-Order Domain Bc and so on) are stored in a coordinate conversion table 32 to be linked to the index date (First-Order Domain B) stored in the position management table 31. The index date corresponds to the database search display region 13 and can be made to correspond to a translated word of a word used as a searched-for character string, various forms of transformed words of the word in question, various kinds of exemplary sentence information of the word in question corresponding to respectively different applications or the like.

The coordinate conversion tables 32 are stored in the RAM 23. On the other hand, each of the second-order domain date stored in a coordinate conversion table 32 includes image information and relative coordinate information, i.e., information about a predetermined coordinate area in which data can be input. More specifically, each second-order domain date includes: coordinate information such as the reference coordinates $(X_{L1}, Y_{L1})$, $(X_{L2}, Y_{L2})$ $(X_{L3}, Y_{L3})$ or the like of each second-order domain, information about the size of each domain in the X and Y directions, index information (including address information stored in the ROM 2Z and the file memory 29) about each domain, and management information such as a flag representing a hierarchical level of the displayed domain data or a flag representing that the domain data is displayed on the uppermost plane. Herein, the coordinates of the upper left corner of a domain are assumed to be used as the reference coordinates of the domain. The relative coordinate information is represented on a segment basis so as to correspond to each index data.

Hereinafter, a method for retrieving index date will be described.

A first-order domain is selected based on the coordinate data supplied from the touch panel controller 26. More specifically, the CPU 21 searches for the first-order domain to which the coordinate data belongs with reference to the position management table 31 and then retrieves the index data of the first-order domain.

Then, based on the retrieved index data, the CPU 21 refers to the corresponding coordinate conversion table 32, thereby retrieving the index data of the second-order domain corresponding to the coordinate data. More specifically, based on the reference coordinates, the CPU 21 converts the relative coordinates of the second-order domain into coordinates to which the reference coordinates belong. If the coordinate data coincides with the converted coordinates of the second-order domain, the index data of the second-order domain is retrieved.

In the case where the user desires to gain access to the ROM 22 or the file memory 29 based on the index data retrieved from the coordinate conversion table 32 for retrieving date at the next hierarchical level, then the next-order domain data corresponding to the retrieved index data is displayed on the display screen 11. In such a case, the flag information corresponding to the original domain or the first-order domain, i.e., the information representing that the domain is located on the uppermost plane of the display screen 11, is updated into information that a current domain is located on a plane immediately below the uppermost plane of the display screen 11, for example, thereby updating the coordinate conversion table 32 of the newly displayed domain data.

On the other hand, in the case where the second-order domain data which has been displayed is erased from the display screen 11, the second-order domain data corresponding to the coordinate conversion table 32 is erased from the display screen 11. Then, the previous-order domain date is displayed on the display screen 11 again end the flag information of the corresponding coordinate conversion tables 32 is updated.

If the domain data is further subdivided based on the management information stored in the coordinate conversion table 32, multiple orders of domain data (e.g., third-order domain data, fourth-order domain data and the like) can be arranged under a hierarchical structure.

Next, the zoom-in and the zoom-out controls to be performed based on the system program stored in the ROM 22 shown in FIG. 3 will be described in detail below.

Figure 10:
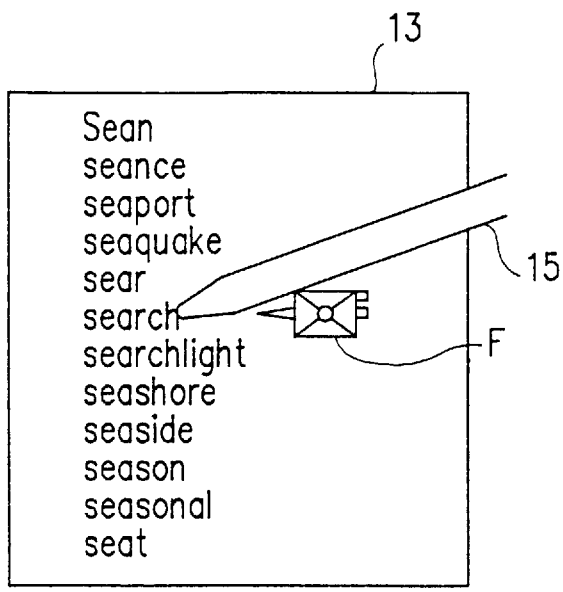
FIG. 10 is a display screen shown in a state where the input pen 15 has come into contact with the key word in the database search display region 13 shown in FIG. 8.

The image information (including character information to be transformed into image information when it is displayed) stored in the RAM 23 or the file memory 29, e.g., dictionary information in the first example, is stored at a maximum resolution. When zoom-out processing is performed or when a scale-down mode is selected, the dot omission ratio of the image information is increased, thereby displaying rough image information as a list within a predetermined region. As a result, the visual range of the stored domain data is increased, i.e., a wide range is displayed on one screen. For example, in the case of displaying English words so as to be arranged in the order of alphabets, the number of English words to be omitted between two displayed words is appropriately set, thereby displaying English words in a wide range on one screen. As shown in FIG. 2A, English words ranging from a character string beginning with a letter "b" to a character string beginning with a letter "t" are roughly displayed. On the other hand, when zoom-in processing is performed or when a magnification mode is selected, the dot omission ratio is decreased, thereby simultaneously displaying finer image information as a list within a predetermined region. When the maximum magnification power Is selected, the image is displayed at the maximum resolution. As a result, the resolution of the domain data is increased, whereas the visual range becomes narrower, i.e., a narrow range is displayed on one screen. For example, in the case of displaying English words so as to be arranged in the order of alphabets, the number of English words to be omitted between two displayed words is finally set to be zero. That is to say, English words in the narrowest range from "sean" to "seat" are displayed, as shown in FIG. 10.

In addition, when the zoom-in and the zoom-out operations are performed, the above-described relative coordinate area in which date can be input is also magnified and/or scaled down.

Next, the detection operation performed by the use of the function cursor F shown in FIG. 2B will be described.

In the same way as the above-described domain data, the image information and a relative coordinate conversion table corresponding to the function cursor F shown in FIG. 2B are stored in the ROM 22.

In the relative coordinate conversion table of the function cursor F, cursor central coordinate data used for displaying a cursor image such that the function cursor F can move around the coordinates of the contact point between the touch panel 1b' and the input pen 15 as a center in accordance with the function of the region f5 is stored. Accordingly, reference coordinates data representing the reference coordinates of the respective regions f1 to f6 (excluding the region f7) regarded as function keys (the reference coordinates are assumed to exist at the upper left corner of each region, for example), region data representing the ranges of the respective regions f1 to f7, and index date used for identifying the respective regions f1 to f7 from each other and executing the functions of these regions (e.g., a zoom-in control function corresponding to the region f3) are stored. It is noted that the region f7 has central coordinate data and radial information.

When the CPU 21 detects that the input pen 15 has come into contact with the touch panel 1b' as shown in FIG. 2A, the function cursor F is displayed as the highest-order domain information on the display screen 11. The cursor in displayed such that the coordinates of the contact point of the input pen 15 become the center of movement in accordance with the function of the region f5. Also, the function cursor F may be erased from the display screen 11 when the input pen 15 is released from the touch panel 1'.

This operation will be described in further detail below. The information about the function cursor F is stored in the position management table 31 shown in FIG. 4 while regarding the cursor as a domain having a highest priority. The cursor information includes: information about the reference coordinates of the function cursor F, information about the size of the entire cursor F, and index information for selecting the cursor coordinate conversion table 32.

In processing this domain information, the cursor coordinate conversion table 32 is preferentially selected, thereby determining which of the seven function keys of the function cursor F has been contacted with the input pen 15. Thereafter, the next highest order domain other than the cursor is selected and processed. While the input pen 15 is in contact with the touch panel 1b', these selections are repeatedly executed at regular intervals. At a point in time when it is detected that the input pen 15 has been released from the touch panel 1b', the processing may be finished and the function cursor F may be erased from the display screen 11. Naturally, the processing may also be supposed to be finished after a predetermined time has passed since it was detected that the input pen 15 had been released from the touch panel 1b'.

Hereinafter, the operation of the information search apparatus in the first example having such a configuration will be described with reference to FIG. 2A and 5.

Figure 5:
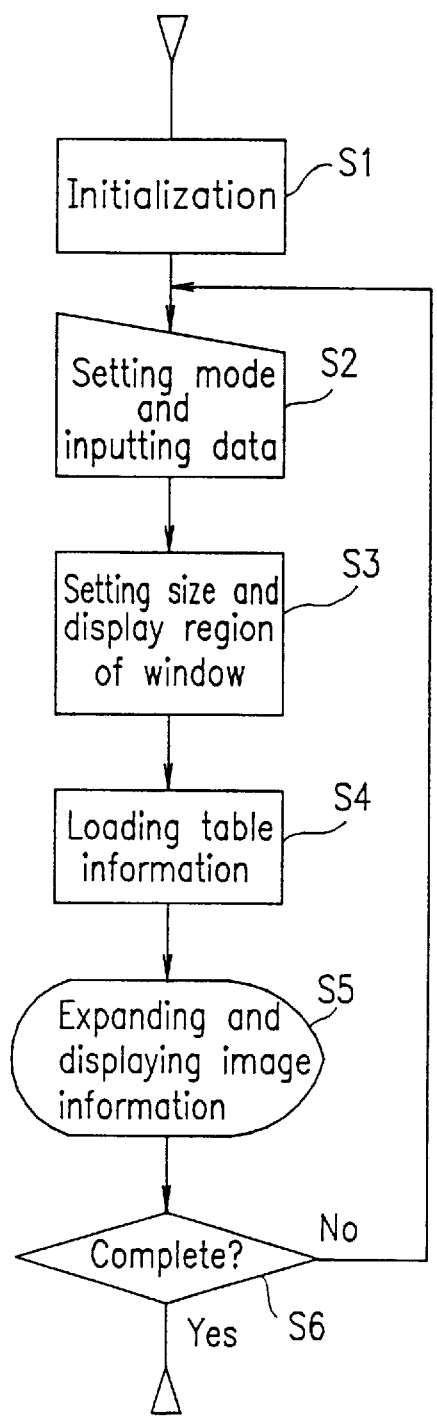
FIG. 5 is a flow chart illustrating the fundamental operation of the information search apparatus 9 shown in FIG. 1.

FIG. 5 is a flow chart illustrating the fundamental operation of the information search apparatus 9 shown in FIG. 1. In this case, the present Invention is assumed to be applied to an electronic dictionary device.

As shown in FIG. 5, when the information search apparatus 9 is turned on, the apparatus is initialized in Step S1, thereby selecting an electronic dictionary mode.

During this initialization, the image information of the dictionary mode selection region 12 of the display screen 11 shown in FIG. 2A and the position management table 31 and the coordinate conversion table 32 corresponding thereto are set and stored into the RAM 23 in the same way as the above-described first-order domain data A, B and C. That is to say, the respective images displayed in the dictionary made selection region 12, e.g. , the icons representing a Japanese dictionary, a classical Chinese-Japanese dictionary, an English-Japanese dictionary and a Japanese-English dictionary, correspond to the respective domain data.

Next, in Step S2, data is input by the use of the input pen 15 to select any of the images displayed in the dictionary mode selection region 12 for representing the is Japanese dictionary, the classical Chinese-Japanese dictionary, the English-Japanese dictionary and the Japanese-English dictionary based on the input data. Then, in Step S3, predetermined size and display region of the window within which the information about the selected dictionary is displayed in accordance with the index information output in response to the pen input are set in the database search display region 13.

Next, in Step S4, table information is loaded into the tables 31 and 32 based on this index information. Then, in Step S5, the image information is expanded and stored in the window area of the display memory 25 in accordance with the index information and displayed on the display unit 1a. In the first example, an English-Japanese dictionary is assumed to be selected. In such a case, a list of English words is selectively displayed in the database search display region 13 as shown in FIG. 2A. Each of these English words corresponds to one domain data.

Finally, in Step S6, the above-described fundamental operation is finished by performing some processing, e.g., turning off the power. In the case where the processing is not performed, e.g., the power is not turned off within a predetermined period, the processing returns to Step S2.

Figure 6:
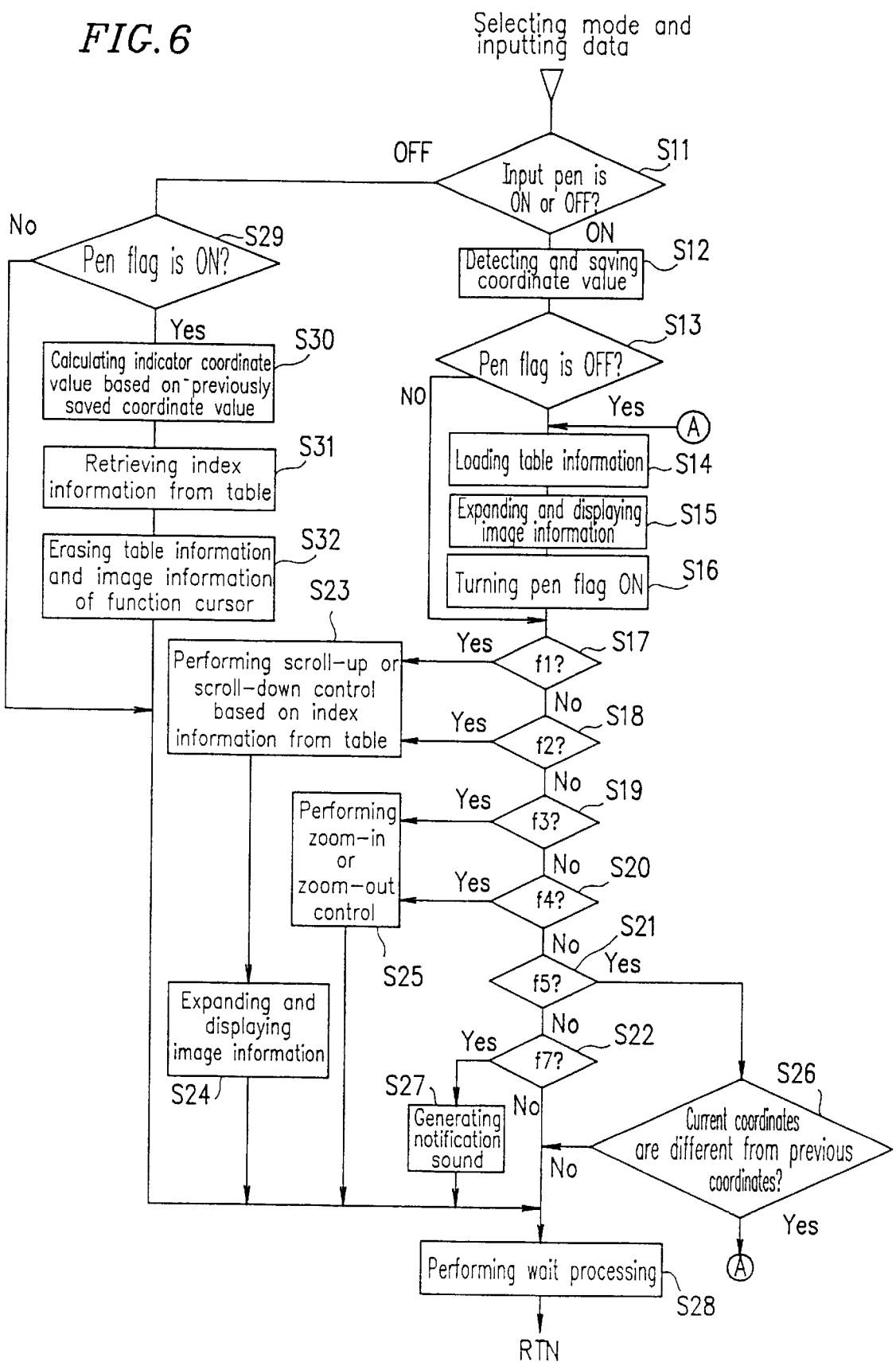
FIG. 6 is a flow chart illustrating exemplary process steps performed in Step 2 shown in FIG. 5 for selecting a mode and inputting data.

FIG. 6 is a flow chart illustrating exemplary process steps performed in Step 2 shown in FIG. 5 for selecting a mode and inputting data.

As shown in FIG. 6, in Step S11, the CPU 21 determines whether or not the input pen 15 has come into contact with the touch panel 1b'. If the input pen 15 has come into contact with the touch panel 1b', the process steps from Step S12 to Step S27 are sequentially performed. Thereafter, in Step S28, wait processing (waiting for a predetermined time) is performed end then Step S11 of determining whether or not the input pen 15 has come into contact with the touch panel 1b' is executed again. Such a process cycle is repeatedly performed. The wait processing executed in Step S28 is performed in order to determine whether or not a now input exists every time a predetermined time has passed. On the other hand, if the CPU 21 determines that the input pen 15 is off (or that the input pen 15 has been released from the touch panel 1b') in Step S11, the process steps from Step S29 to Step S3Z are sequentially performed.

First, in Step S11, if the CPU 21 determines that the input pen 15 has been turned on as a result of the contact with the touch panel 1b', the coordinates of the contact point between the touch panel 1b' and the input pen 15 are detected and the coordinate value is saved in Step S12.

Next, in Step S13, it is determined whether or not the pen flag is off. That is to says the CPU 21 determines whether or not it is the first pen input. If this is not the first pen input, Steps S14 to S16 are skipped, thereby jumping to Step S17 for determining which of the six regions f1 to f5 and f7 of the function cursor F has been selected. On the other hand, if this is the first pen input, the table information corresponding to this function cursor F is loaded onto the tables 31 and 32.

Then, in Step S15, the image information of the function cursor F shown in FIG. 2B is expanded and stored in the display memory 25 and then displayed in the display unit 1*a*. In the Steps S14 and S15, the region in which the function cursor F is displayed is defined as follows. First, the coordinates of the function cursor F are calculated such that the coordinates, at which the top end of the input pen 15 is located, correspond to the coordinates at the end of the region f5 shown in FIG. 2B. Then, the image information of the function cursor F is expanded and stored in the display memory 25 and then displayed in the display unit 1*a*. Thereafter, in Step S16, the pen flag is turned on, thereby indicating that the input pen 15 is in contact with the touch panel 1*b'*.

Next, in Steps S17 to S22, it is determined which of the six regions f1 to f5 and f7 of the function cursor F has been selected. In Steps S17 to S22 the position at which the top end of the input pen 15 is located is determined based on the detected coordinates of the input pen 15 with reference to the table 31 and it is determined which of the six functions corresponding to the six regions f1 to f5 and f7 of the function cursor F has been specified by the input pen 15 in accordance with the index information retrieved from the table 31. It is noted that Step S26 is acknowledged in the case of the first pen input.

Moreover, in Steps S17 and S18, if it is determined that the region f1 or the region f2 of the function cursor F has been selected by the pen input, then the CPU 21 examines the date scroll instruction corresponding to the pen input location. As a result, in Step S23, the CPU 21 executes the scroll processing with respect to the display section 1, thereby performing a scroll-up control or a scroll-down control with respect to the screen information within the database search display region 13 displayed on the display screen 11.

Thereafter, in Step S24, the display start position of the image information to be displayed is changed in accordance with the index information (or the domain data) stored in the table 31, information about an amount corresponding to the window size is expanded and stored again in the display memory 25 and then a new image is displayed in the display unit 1*a*. Note that this scroll technique itself has already been well known.

On the other hand, in Steps S19 and S20, if it is determined that the region f3 or the region f4 of the function cursor F has been selected by the pen input, then the CPU 21 determines that a zoom-in control or a zoom-out control has been instructed based on the pen input location. As a result, in Step S25, the CPU 21 executes the zooming processing with respect to the display section 1, thereby performing a zoom-in control or a zoom-out control on the screen information displayed on the display screen 11. The zoom-in control and the zoom-out control will be described in detail later with reference to FIG. 7.

Furthermore, in Step, S21, if it is determined that the region f5 of the function cursor F has been selected by the pen input, i.e., that the input pen 15 has been moved while the pen 15 is in contact with the touch panel 1*b*, then it is determined that the previously saved coordinates of the input pen are different from the currently detected coordinates in Step S26. In such a case, previous Steps S14 to S16 are repeated, so that the table and the function cursor F are expanded and stored (or rewritten) in the display memory 25 and then a new image is displayed in the display unit 1*a*. That is to say, the entire function cursor F shown in FIG. 2B is moved on the display screen 11 so as to follow the movement of the input pen 15.

Furthermore, in Step S22, if the CPU 21 determines that the region f7 of the function cursor F shown in FIG. 2B has been selected by the pen input while the pen 15 is in contact with the touch panel 1*b*, then the notification sound control processing is executed in Step S27. As a result, an audio signal is supplied via the I/O control LSI 7' for a predetermined time, thereby generating a notification sound through a buzzer 8' or the like. The region f7 of the function cursor F is provided as the center region of the cursor or a junction among the respective regions f1 to f4 in which the respective functions are interchanged. Thus, if this notification sound is generated, then the user can know that the functions have been interchanged. Therefore, even when the user has committed an operation error, this notification sound can call the user's attention to the error. In addition, by notifying that the functions have been interchanged by means of such a sound, the user can execute various functions without watching the function cursor F on the display screen 11. After Steps S24, S25 and S27 have been executed and if the results of determination in Steps S22 and S26 are "NO", the wait processing (for waiting for a predetermined time) in Step S28 is executed.

Next, a case where the input pen 15 has been released from the touch panel 1*b'* will be described.

If it is determined that the input pen 15 is off or has been released from the touch panel 1*b'* in Step S11, then it is determined whether or not the pen flag is on in Step S29. Herein, the pen flag is assumed to be on when it is determined that the input pen 15 has been released from the touch panel 1*b'*. If the pen flag is not on, then the wait processing (waiting for a predetermined time) in Step S28 is executed. On the other hand, if the pen flag is on, then in step S30 the coordinates located in the region f6 (or the cursor indicator) shown in FIG. 2B are calculated based on the coordinate value saved in Step S12.

Furthermore, in Step S31, the domain data corresponding to the calculated coordinate value is selected from the table 31 and the index information thereof is retrieved. Based on this index information, an interrupt is performed into Step S2 shown in FIG. 5, thereby reading out the corresponding next-order domain date from the ROM 22 or the file memory 29. Then, the domain data is expanded and stored in the display memory 25 and then displayed in the display unit 1*a*, in the above-described manner.

In the first example, it is possible to search for Japanese translation information and the like corresponding to an English word or to use the English word as a copy in other modes, for example. That is to say, information which is displayed while the input pen 15 is off can be processed as one input information.

Moreover, in Step S32, the table information and the image information of the function cursor F are erased and the wait processing is executed in Step S28.

Hereinafter, the above-described zoom-in and zoom-out controls will be described in detail with reference to the flow chart shown in FIG. 7.

Figure 7:
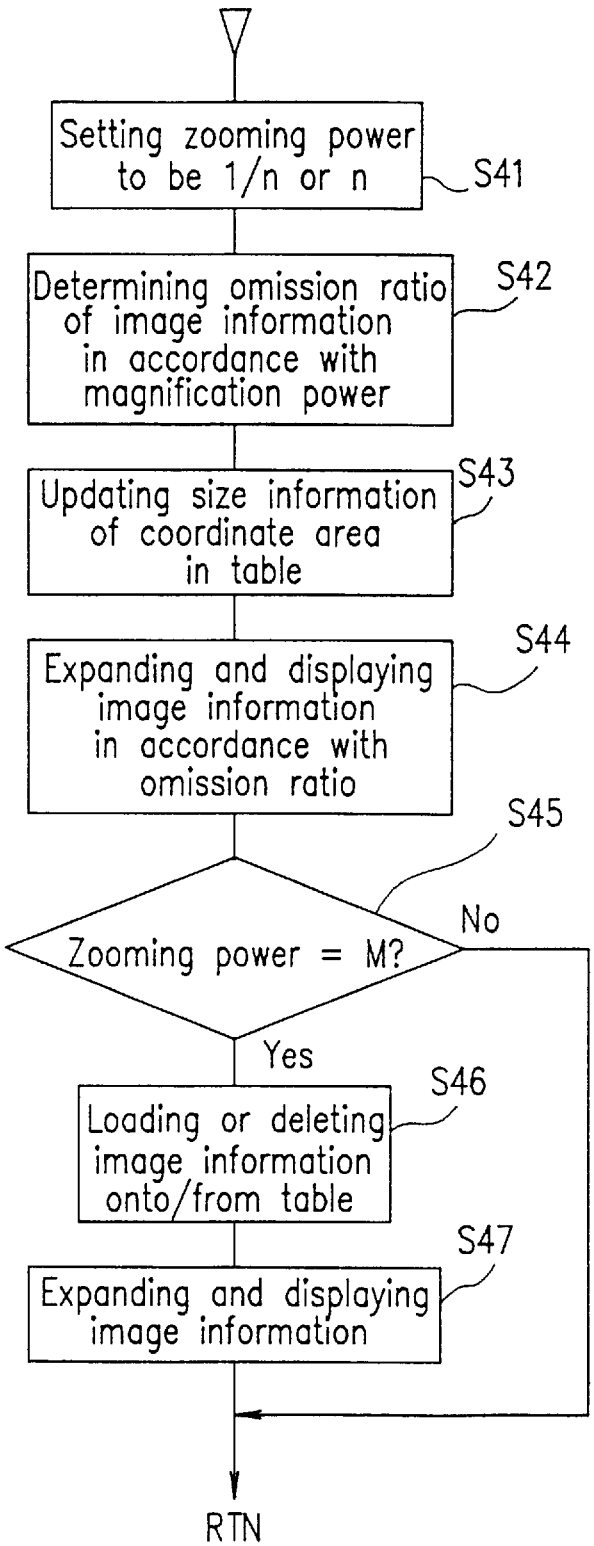
FIG. 7 is a flow chart illustrating exemplary process steps for performing a zoom-in control and a zoom-out control according to the present invention.

The operations performed in Steps S41 to S47 shown in FIG. 7 are executed by the CPU 21 with respect to the display section 1 every time a zooming instruction is input.

First, in Step S41, a zooming magnification power is set. Herein, a zoom-out magnification power is assumed to be represented as 1/n, while a zoom-in magnification power is assumed to be represented as n. This magnification power is set every time this Step S41 is executed. In accordance with this magnification power, the omission ratio of the image information and whether the coordinate area is to be scaled down or magnified are determined in Step S42. As this omission ratio becomes larger, the image information to be displayed is scaled down and the display information range becomes wider. On the other hand, the smaller the omission ratio becomes, the larger the amount of the information to be displayed becomes. As a result, the image information is magnified and the information range becomes narrower.

Next, in Step S43, the information about the size of the coordinate area is updated in the table in accordance with the omission ratio. Then, in Step S44, the image information corresponding to the omission ratio is expanded and stored again in the display memory 25 and then displayed in the display unit 1a.

Furthermore, in Step S45, it is determined whether or not the magnification power has reached a predetermined zooming power M, which differs depending upon whether the zoom-in control or the zoom-out control has been performed. Herein, if the magnification power has reached M, then the process steps starting from Step S46 are sequentially performed.

In Steps S46 and S47, if the zoom-in control is performed, the above-described next-order domain data is retrieved and expanded in the table and the image information thereof is expanded and stored in the display memory 25 and then displayed in the display unit 1a. On the other hand, if the zoom-out control is performed, the table and the image information of the currently displayed domain data are deleted and the previous-order domain data is expanded and stored in the display memory 25 and then displayed in the display unit 1a.

Hereinafter, another specific example of the process steps performed in Step S2 shown in FIG. 5 for selecting a mode and inputting data will be described.

As shown in FIG. 2A, when an electronic dictionary mode is selected, the dictionary mode selection region 12 is displayed on the screen. If the English-Japanese dictionary is selected in the dictionary mode selection region 12 by the use of the input pen 15, for example, an initial screen is displayed and initial search character strings are displayed in the database search display region 13 at the largest omission ratio in addition to the dictionary mode selection region 12.

Figure 8:
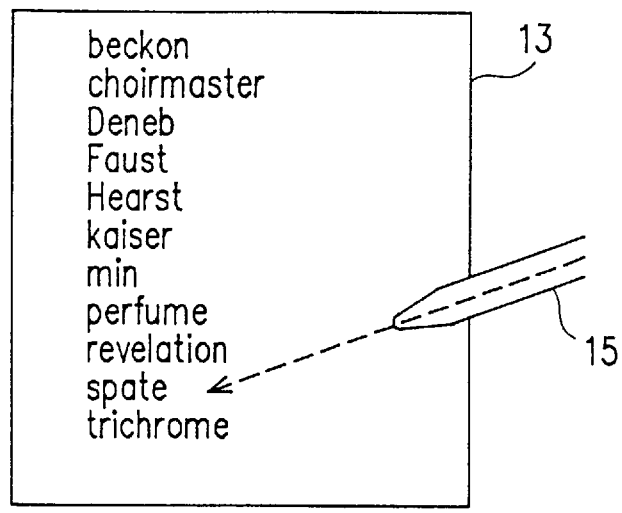
FIG. 8 is a display screen shown in a state where the input pen 15 is being brought to the database search display region 13 of the exemplary information search apparatus in the first example of the present invention.
Figure 9:
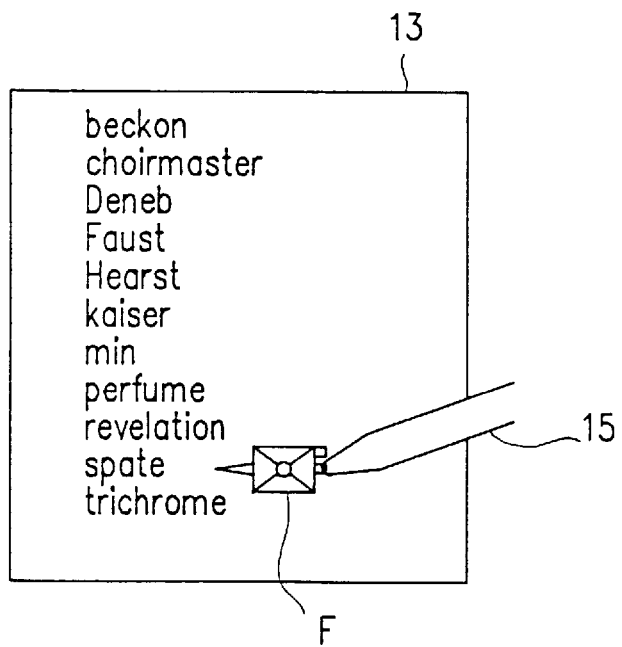
FIG. 9 is a display screen shown in a state where the input pen 15 has come into contact with an English word in the vicinity of a key word in the database search display region 13 shown in FIG. 8.

Next, it will be described how the English-Japanese dictionary function is utilized for searching for a Japanese translation corresponding to a search character string "search" used as an exemplary desired key word. FIG. 8 shows a state where the input pen 15 is being brought near to the region in which a character string "spate" having a spelling most similar to that of the searched-for character string "search" is located. In this state, the location of the character string "spate" having a spelling most similar to that of the searched-for character string "search" Is specified from the displayed character strings 16 by the use of the input pen 15. Then, it is determined whether or not a specification operation has been performed by the use of the input pen 15. If it is determined that the specification operation has been performed by the use of the input pen 15, a character string code corresponding to the desired character string is temporarily stored, thereby setting the position detection code and the character string code. Then, as shown in FIG. 9, when it is detected that the input pen 15 has come into contact with any character string in the dictionary mode, the function cursor F is displayed. The position of this function cursor F is controlled such that the top end of the input pen 15 points the region f5. When the input pen 15 is released, the display position of the function cursor F is fixed and the character string "spate" corresponding to the arrow region f6 is selected.

As described above, the regions f1 to f5 and f7 correspond to the respective input regions of the function cursor F. When it is detected which of these six input regions has been pushed by the input pen 15, a control corresponding to the detected region is performed. More specifically, if the region f1 has been pushed, an upward character string movement control is performed; if the region f2 has been pushed, a downward character string movement control is performed; if the region f3 has been pushed, a display zoom-in control is performed; if the region f4 has been pushed, a display zoom-out control is performed; if the region f5 has been pushed, a window position movement control and a character string selection control are performed; and if the region f7 has been pushed, a sound generation control is performed.

For example, if the top end of the input pen 15 is contacted with the region f4 after the position of the function cursor F has been fixed, the space between adjacent words is magnified around the character string "spate", so that a plurality of words successively appear in the order of alphabets in the vicinity of "spate". When the space between words has been excessively magnified, the input pen 15 is moved to the region f3, thereby scaling down the space. In this case, if the input pen 15 passes through the region f7 located at the center of the function cursor F, then a notification peep sound is generated. In this way, if the user moves the input pen 15 without releasing the input pen 15 from the display tablet 1b, then a sound is generated when the input pen 15 passes through the region f7. Thus, the zoom-in (magnification) and the zoom-out (scaling down) control operations can be repeatedly performed easily even if the user does not watch the regions carefully in moving the input pen 15. Thereafter, when the searched-for character string "search" is found, the input pen 15 is released from the function cursor F. If the searched-for character string "search" is located above the function cursor F, then the input pen 15 is contacted with the region f1, so that the display screen is scrolled down. And, if the input, pen 15 is released from the function cursor F at the position of the searched-for character string "search" and directly contacted with the character string, then the searched-for character string "search" can be specified.

By repeatedly performing the specification operations on the regions f1 to f5 and f7 by the use of the input pen 15 in this way, the desired key word or the searched-for character string "search" can be finally found. After the region assigned to the character string has been specified by directly contacting the input pen 15 with the region as shown in FIG. 10, the character string codes are reset.

Figure 11:
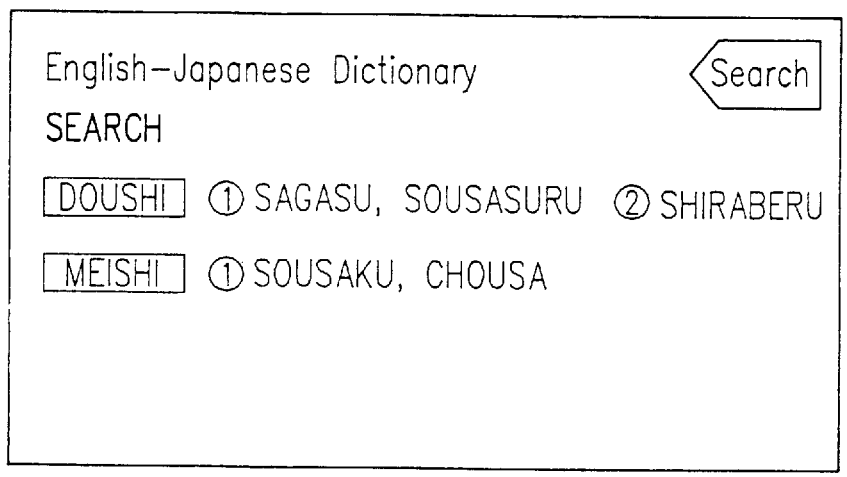
FIG. 11 is a display screen shown in a state where information associated with the key word is displayed in the database search display region 13 shown in FIG. 8.

Subsequently, if the conversion key region 14 is specified by pressing the input pen 15 onto the region, the information associated with the desired key word or the searched-for character string "search" is displayed in the database search display region 13 on the display screen 11 of the display unit 1a via the display memory 25 as shown in FIG. 11. In this case, since the English-Japanese dictionary was selected in the dictionary mode selection region 12 on the initial screen and "search" was selected as the key word in the database search display region 13, the Japanese translations of the key word "DOUSHI (verb); (1) SAGASU (look for), CHOUSA-SURU (investigate); (2) SHIRABERU (examine), MEISHI (noun); (1) SOUSAKU (search), CHOUSA (examination)" are displayed on the display screen 11 together with the name of the selected dictionary and the key word itself. The search control is finished in this way.

As described above, only by touching the respective regions of the function cursor F on the display tablet 1b while holding the input pen 15 in hand, the user can perform various kinds of operations such as a zoom-in (magnification) control, a zoom-out (scaling down) control and upward and downward screen scrolling controls. Thus, in a small-sized and plate-shaped portable electronic device such as a liquid crystal tablet type computer, the user can easily perform these operations as if he were looking at, writing on or looking over a book or a notebook. In addition, since the uses can perform the specification controls while watching only the vicinity of the top end of the input pen 15, the user can perform various kinds of operations in the respective regions of the function cursor F on the display tablet 1b by the use of the input pen 15 within the region on which the user's attention is currently concentrated. Therefore, it is no longer necessary for the user to turn away from the region on which the user's attention is currently concentrated, so that the user's attention is not disturbed or the user's operation is not interrupted. As a result, desired information can be searched for more smoothly and the operation methods become simpler and more natural. Furthermore, the specification operations such as the zoom-in and the zoom-out controls can be easily interchanged in the vicinity of the remarked word. Moreover, in some cases, the user can confirm the interchange by means of a notification sound without watching the interchanged regions. Thus, desired information can be smoothly searched for by performing the pen operations.

In the first example, a region f5 for moving the function cursor F is provided for the function cursor F. However, in an alternative embodiment, this region f5 may be omitted. In such a case, the region f7 is not used for generating a sound but for moving the function cursor F. Then, it becomes necessary to temporarily release the input pen 15 over the region f7 while the input pen 15 is moved between the regions f3 and f4. However, even when the user wants to move the function cursor F, it is not necessary to largely move the input pen 15. In addition, since the region f5 no longer exists in this alternative embodiment, the size of the function cursor F can be reduced.

Also, in the first example, a region f7 for generating a sound is provided for the function cursor F and a conversion key region 14 for instructing the conversion is separately provided. Alternatively, the region f7 may be used for both of these purposes, namely for a sound generation and a conversion instruction. In such a case, the search through an electronic dictionary and the display of the search result are realized within the regions of the function cursor F. Thus, desired information can be searched for more smoothly by performing the pen operations.

Now, the operation to be performed when the region f7 of the function cursor F is simultaneously used for a sound generation and a conversion instruction will be described.

First, it is determined whether or not the region f7 of the function cursor F was pressed by the input pen 15. If the region f7 was pressed by the input pen 15, then it is determined whether the input pen had continuously been in contact with one of the regions f1 to f4 until the region f7 was pressed by the input pen 15 or the input pen 15 had temporarily been released from one of the regions f1 to f4 before the input pen 15 was pressed onto the region f7. If the determination result is the former (or if the input pen has continuously been ON), then A sound is generated. On the other hand, if the determination result is the latter, then a search is performed through a dictionary and the search result is displayed. It is 1so possible to determine whether the former or the latter is true based on a time during which the region f7 had been pressed.

Furthermore, in this first example, the function cursor F is assumed to be displayed at the same concentration as that of the character strings. Alternatively, the function cursor F may be displayed at a lower concentration or in a different color such that the cursor can be easily identified from the character strings.

EXAMPLE 2

In this second example, a circular image is used as a function cursor F' for performing zoom-in end zoom-out controls. In this case, the operative functions of the regions f1, f2 and f5 shown in FIG. 2B are required to be executed by separately fixed function keys. In addition, the region f7 shown in FIG. 2B may be provided as a concentric circle between an outer region RO and an inner region RI.

Figure 12A:
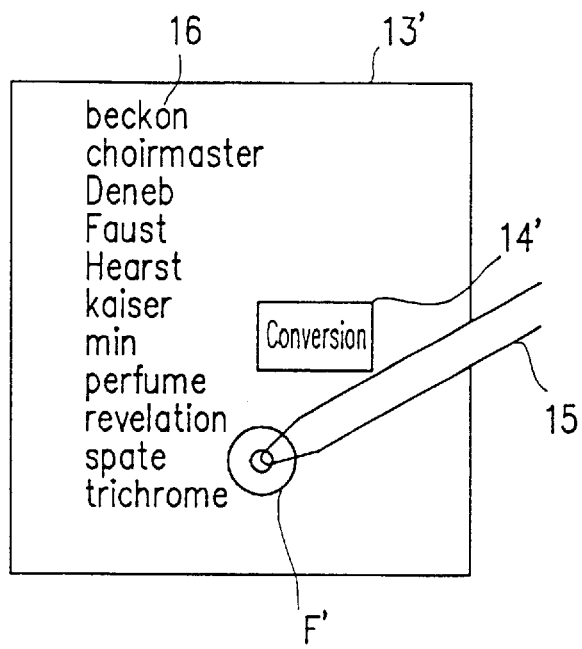
Figure 12B:
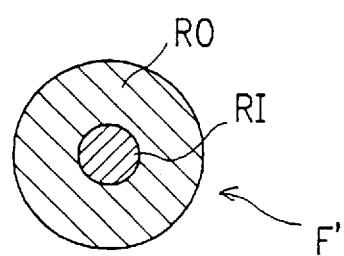
FIG. 12B is an enlarged view of the function cursor F' shown in FIG. 12A.

FIG. 12A is a diagram showing a database search display region on the display screen of the exemplary information search apparatus in the second example of the present invention, while FIG. 12B is an enlarged view of the function cursor F' shown in FIG. 12A. The second example is the same as the first example except that a function cursor F' is used instead of the function cursor F of the first example. Thus, the description of the functional configuration shown in FIG. 1, the display screen 11 shown in FIG. 2A, the hardware configuration shown in FIG. 3, the data structure shown in FIG. 4 and the flow charts shown in FIGS. 5, 6 and 7 will be omitted herein.

As shown in FIGS. 12A and 12B, when the input pen 15 is contacted with the display tablet 1b at a position near the desired character string, the concentric circular function cursor F' is displayed at a position in the vicinity of the character string. This function cursor F' has input specification regions RI and RO. If the input pen 15 contacts the inner, smaller circular region RI, then the zoom-in control is performed. On the other hand, if the input pen 15 contacts the outer, larger circular region RO, then the zoom-out control is performed. In this case, the display screen may be scrolled up or down by moving the input pen 15 upward or downward in a region other then the region assigned to the function cursor F' as described later in the third example.

This function cursor F' is a concentric circular graphic. In the same way as the above-described function cursor F, this function cursor F' is also stored as relative coordinates. Then, the absolute coordinates thereof are detected with reference to the first contact point of the input pen 15. In the second example, the user no longer feels uneasiness between the variation of the image in a direction caused when the zoom-in and the zoom-out controls are performed and the key manipulations. The movement of the input pen 15 in the horizontal (or lateral) direction has been eliminated as much as possible. In this example, the regions defined by the concentric circles are used as the key detection regions.

EXAMPLE 3

In a third example, the movement of the input pen 15 in any of the four directions (i.e., upward, downward, rightward and leftward directions) on the display screen is controllably detected while keeping the input pen 15 in contact with the searched-for character string, thereby performing the respective controls in the four directions, the zoom-in (magnification) and the zoom-out (scaling down) controls and the upward and the downward screen scrolling controls. The above-described first example is suitably applicable to equipment in which a certain amount of space can be assigned to the function cursor F. On the other hand, the method of the third example is effectively applicable to the case where the database search display region is not so large.

Figure 13:
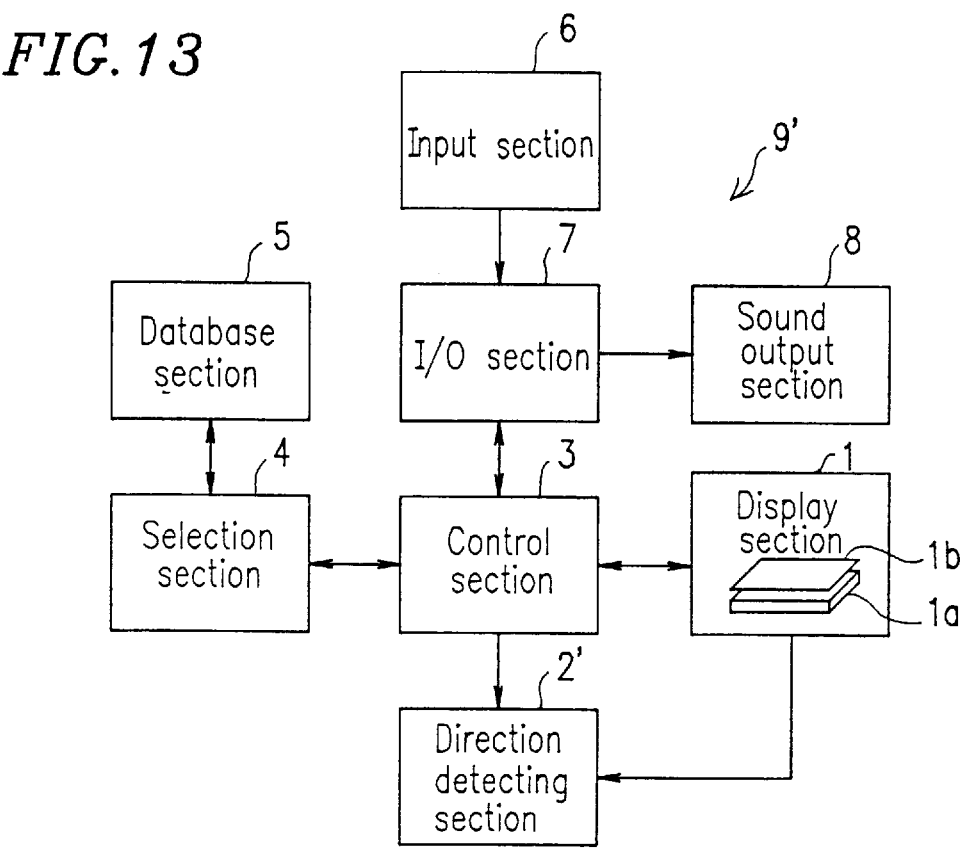
FIG. 13 is a block diagram showing the functional configuration of an information search apparatus 9' in a third example of the present invention.

FIG. 13 is a block diagram showing the configuration of an information search apparatus 9' in the third example of the present invention. In FIG. 13, the components having the same functions as those of the respective components shown in FIG. 1 are identified by the same reference numerals and the description thereof will be omitted herein. The third example is the same as the first example except that the function cursor F is not used in the third example. Thus, the description of the display screen 11 shown in FIG. 2A, the hardware configuration shown in FIG. 3, the data structure shown in FIG. 4 and the flow charts shown in FIGS. 5, 6 and 7 will be omitted herein.

In FIG. 13, a direction detecting section 2' detects the movement direction of the input pen 15 which has come into contact with the display tablet 1*b* at an arbitrary position. In accordance with the direction detected by the direction detecting section 2', the control section 3 controls the selection section 4 to extract a group of character strings from the database section 5 at a narrower extraction interval and simultaneously display the group of character strings as a list on the display section 1. The control section 3 also controls the selection section 4 to extract a group of character strings from the database section 5 at a wider extraction interval and simultaneously display the group of character strings as a list on the display section 1. The control section 3 may also control the selection section 4 to perform a scroll up or a scroll down control in accordance with the index information supplied from the table, thereby expanding and storing the image information in the display memory 35 and displaying the information onto the display unit 1*a*.

Figure 14:
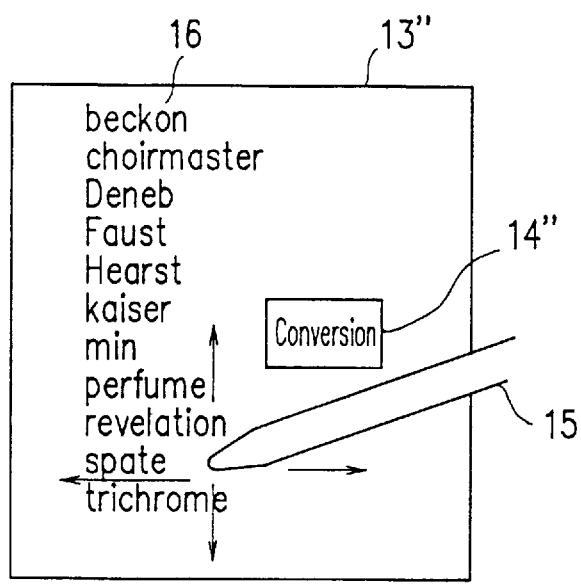
FIG. 14 is a diagram showing a database search display region on the display screen of the exemplary information search apparatus in the third example of the present invention.

FIG. 14 is a diagram showing a database search display region on the display screen of the exemplary information search apparatus 9' in the third example of the present invention.

In FIG. 14, a Japanese translation corresponding to a searched-for character string "search" selected as a target key word is assumed to be searched for. In such a case, if the top end portion of the input pen 15 is moved in a upward, downward, rightward or leftward direction within the detection region of a character string "spate" having a spelling most similar to that of the searched-for character string "search", then the direction and the position of the movement operation are detected by the CPU 21, which, in response, performs various kinds of control operations. For example, if the top end portion of the input pen 15 is moved leftward, the movement operation is detected by the CPU 21, so that the zoom-out (scaling down) control is performed at the detected location. On the other hand, if the top end portion of the input pen 15 is moved rightward, the movement operation is detected by the CPU 21, so that the zoom-in (magnification) control is performed at the detected location. Moreover, if the top end portion of the input pen 15 is moved upward, the movement operation is detected by the CPU 21, so that a scroll-down control of the screen is performed. Furthermore, if the top end portion of the input pen 15 is moved downward, the movement operation is detected by the CPU 21, so that a scroll-up control of the screen is performed. In the first example, the conversion key region 14 is provided outside the database search display region 13. However, in this third example, the conversion key region 14" is provided in the vicinity of the region in which the specification control is performed by use of the input pen 15 (or the range in which the user is not required to turn aside) within the database search display region 13". Since the conversion key region 14" is nearer to the region in which the specification control is performed, the conversion operation can be performed more easily. By performing the specification control by pressing the input pen 15 onto the conversion key region 14", Japanese translations are displayed as the associated information corresponding to the searched-for character string or the key word within the database search display region 13".

In detecting this movement operation, if the movement corresponds to two or more successive points on the screen, then the movement direction can be detected as any of the four directions (i.e., upward, downward, rightward and leftward directions) with respect to the reference point.

Hereinafter, the operation of the information search apparatus of the third example having the above-described configuration will be specifically described.

First, when an electronic dictionary mode is selected, an initial image such as that shown in FIG. 2A is displayed on the display screen and an initial group of search character strings such as the search character strings 16 are displayed within the database search display region 13".

Next, when the region assigned to a character string having a spelling most similar to that of the desired character string is specified by manipulating the input pen 15, a character string code corresponding to the desired character string is temporarily stored in the RAM 23. Furthermore, simultaneously with the selection of the character string, the conversion key region 14" is displayed as a conversion input window within the database search display region 13". That is to say, simultaneously with the detection of the contact between the input pen 15 and the display tablet 1*b*, a "conversion" icon is displayed in the display unit 1*a* so as to have coordinates which are expanded and stored in the display memory 25 to be a little distant from the coordinates of the contact point.

Then, while keeping the input pen 15 pressed onto the display tablet 1*b*, the user moves the input pen 15 in a certain direction. The movement direction is detected by the CPU 21 as any of the four directions (i.e., upward, downward, rightward and leftward directions).

Thereafter, in accordance with the detected direction, the CPU 21 performs any of the various kinds of controls, e.g., the upward or the downward character string movement control or a zoom-in or a zoom-out control of the display.

Furthermore, if the desired character string is found after repeating these control operations, then the character string is specified by the use of the input pen 15 and then the character string code is reset.

Subsequently, if the conversion key region 14" is specified by the use of the input pen 15, then the CPU 21 instructs a search, for example, through an English-Japanese dictionary corresponding to the finally found character string. As a result, a desired Japanese translated word corresponding to the target English word is expanded and stored in the display memory 25 and finally displayed in the display unit 1*a* as shown in FIG. 11.

Thus, in the third example, it is possible to specify the searched-for character string only by moving the input pen 15 in any of the four directions (i.e., upward, downward, rightward and leftward directions) while keeping the input pen 15 in contact with the display tablet 1*b*. Therefore, the user is no longer required to master the procedure of the first example and can perform various kinds of controls more easily.

In the first to the third examples, the present invention is assumed to be applied to an electronic dictionary search. Naturally, the present invention is applicable to a general purpose search such as a telephone number search, an address search or a date search.

As is apparent from the foregoing description, the present invention can solve the problems caused when a mouse is used, particularly when a mouse is used for a small-sized portable electronic device by adopting a pen input type display tablet as an input device for a database search system. More specifically, unlike the case of using a mouse, a user is no longer required to secure a flat space in using a small-sized portable device. In addition, even when a user is travelling in transport facilities, the user can correctly perform various kinds of specification controls. Therefore, the present invention can improve the poor performance of a conventional pen input type apparatus. In addition, since a user is no longer required to turn away from the position on which the user's attention is now concentrated, the user's attention is not disturbed or the user's operation is not interrupted, so that desired information can be searched for more smoothly.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An information search apparatus comprising:

a memory storing character information, wherein the character information represents a plurality of character words;

a touch-sensitive display tablet displaying at least one character and displaying a function cursor for receiving input commands regarding a search for a desired character word;

a detector sensing a position on the display table at which an input pen contacts the display tablet; and a controller moving the function cursor to the position on the display tablet corresponding to the input pen and corresponding to a displayed character word adjacent the function cursor, wherein the displayed character is displayed in a non-contiguous list of character information, and wherein the controller selects and displays on the display tablet a plurality of selected character words from the character information for searching for the desired character word, wherein the selected character words are similar to the displayed character word.

2. An information search apparatus as in claim 1 further comprising:

a zoom-in area associated with the function cursor, and wherein the controller selects from the character information additional character words for display when the detector senses the input pen touching the zoom-in area, and wherein the additional character words are non-contiguous within the character information and more similar to the displayed character word pointed to by the function cursor than are the character words already displayed.

3. An information search apparatus according to claim 2, wherein the character words are selected from a group consisting of a Japanese dictionary, a classical Chinese-Japanese dictionary, an English-Japanese dictionary and a Japanese-English dictionary.

4. An information search apparatus according to claim 1, wherein the character words are selected from a group consisting of a Japanese dictionary, a classical Chinese-Japanese dictionary, an English-Japanese dictionary and a Japanese-English dictionary.

5. An information search apparatus according to claim 1, wherein the function cursor has a zoom-in operation indicia and a zoom-out operation indicia, and wherein the controller sets an interval between the non-contiguous character words to be a first interval when the zoom-in operation indicia has been pushed by the input pen and sets a second interval between the non-contiguous character words to be applied to select the additional character words when the zoom-out operation indicia has been pushed by the input pen, and wherein the second interval is wider than the first interval.

6. An information search apparatus according to claim 1, wherein the function cursor has a scroll operation indicia for controllably specifying one of an upward and a downward display tablet movement and a movement operation indicia for specifying and moving a display position of the function cursor by using the input pen.

7. An information search control method comprising the steps of:

storing character information, wherein the character information is organized in a database arrangement;

detecting a position at which an input pen touches a display tablet, the display tablet having a function of displaying at least one character information and a function of inputting data;

displaying a function cursor at the detected position of the input pen, wherein the cursor is used for searching for arbitrary character information in a non-continuous list of character information; and extracting a plurality of characters from the character information for searching for the arbitrary character information from the database of character information, wherein the extracted characters are similar to a character pointed to by the function cursor.

8. An information search control method as in claim 7 further comprising the steps of:

extracting the plurality of characters from the character information based on the detected direction of the function cursor for searching for the arbitrary character information through the character information.

9. A method for searching a database using a computer system having a processor, touch-sensitive display, and a memory storing a database of character information in a searchable arrangement, wherein the method comprises the steps of:

a. selecting character information from the database for display, wherein the selected character information is is arranged for display as a non-contiguous list of character information;

b. displaying the selected character information as the non-contiguous list of character information on the display;

c. displaying a functional cursor on the display and pointing the cursor to a particular character information of the displayed selected character information using a pen input to move the cursor;

d. touching a zoom-in area of the functional cursor to cause the display of additional character information from the database, wherein the additional character information was not previously displayed in step (b), and e. the additional character information is more similar to the particular character information of step (c) than to other selected character information displayed in step (b).

10. A method for searching a database as in claim 9 further comprising the step (f) of emitting a beep sound when the input pen passes over a center section of the function cursor.

11. A method for searching a database as in claim 9 wherein the database is a dictionary.

12. A method for searching a database as in claim 9 wherein the database includes a Japanese dictionary, a classical Chinese-Japanese dictionary, an English-Japanese dictionary and a Japanese-English dictionary.

* * * * *